(12) United States Patent
Conrad et al.

(10) Patent No.: US 11,440,221 B2
(45) Date of Patent: Sep. 13, 2022

(54) DEVICE AND METHOD FOR PRODUCING A DYED AND AN UNDYED PLASTIC MELT

(71) Applicant: Coperion GmbH, Stuttgart (DE)

(72) Inventors: Ulrich Conrad, Elze (DE); Norbert Kern, Tamm (DE); Markus Schmudde, Murr (DE); Bernhard Stöhrer, Pleidelsheim (DE); Heiko Hornberger, Hessigheim (DE)

(73) Assignee: Coperion GmbH, Stuttgart (DE)

( * ) Notice: Subject to any disclaimer, the term of this patent is extended or adjusted under 35 U.S.C. 154(b) by 867 days.

(21) Appl. No.: 16/326,027

(22) PCT Filed: Jul. 27, 2017

(86) PCT No.: PCT/EP2017/068948
§ 371 (c)(1),
(2) Date: Feb. 15, 2019

(87) PCT Pub. No.: WO2018/033354
PCT Pub. Date: Feb. 22, 2018

(65) Prior Publication Data
US 2019/0168418 A1 Jun. 6, 2019

(30) Foreign Application Priority Data
Aug. 17, 2016 (EP) .................................. 16184 549.0

(51) Int. Cl.
*B29B 7/60* (2006.01)
*B29B 7/48* (2006.01)
(Continued)

(52) U.S. Cl.
CPC .............. *B29B 7/603* (2013.01); *B29B 7/404* (2013.01); *B29B 7/487* (2013.01); *B29B 7/488* (2013.01);
(Continued)

(58) Field of Classification Search
CPC ......... B29B 7/603; B29B 7/404; B29B 7/487; B29B 7/488; B29B 7/72; B29B 7/7461;
(Continued)

(56) References Cited

U.S. PATENT DOCUMENTS

| 3,575,382 A | 4/1971 | Loomans |
| 5,053,176 A | 10/1991 | Cameron et al. |

(Continued)

FOREIGN PATENT DOCUMENTS

| CN | 101068672 A | 11/2007 |
| CN | 102133781 A | 7/2011 |

(Continued)

*Primary Examiner* — Charles Cooley
(74) *Attorney, Agent, or Firm* — McGlew and Tuttle, P.C.

(57) ABSTRACT

A device for producing a dyed plastic melt and an undyed plastic melt includes a multi-shaft screw extruder, a first metering installation, a second metering installation, and a control installation for selecting between a first operating mode for producing the dyed plastic melt and a second operating mode for producing the undyed plastic melt. The first metering installation serves for feeding an undyed plastic material through a first infeed opening into a housing of the multi-shaft screw extruder, and the second metering installation serves for feeding at least one color granulate through a second infeed opening into the housing. The plastic material is fed exclusively by way of the first infeed opening such that residual color granulate or dyeing agent contained therein, respectively, which is still located in the second metering installation or in the region of the second infeed opening does not contaminate the undyed plastic melt.

20 Claims, 5 Drawing Sheets

(51) Int. Cl.
  *B29B 7/72* (2006.01)
  *B29B 7/80* (2006.01)
  *B29B 7/88* (2006.01)
  *B29B 9/06* (2006.01)
  *B29C 48/285* (2019.01)
  *B29C 48/25* (2019.01)
  *B29C 48/27* (2019.01)
  *B29C 48/385* (2019.01)
  *B29C 48/39* (2019.01)
  *B29B 7/74* (2006.01)
  *B29B 7/40* (2006.01)
  *B29B 9/12* (2006.01)
  *B29K 105/00* (2006.01)

(52) U.S. Cl.
  CPC .............. *B29B 7/72* (2013.01); *B29B 7/7461* (2013.01); *B29B 7/802* (2013.01); *B29B 7/88* (2013.01); *B29B 9/06* (2013.01); *B29C 48/2526* (2019.02); *B29C 48/2692* (2019.02); *B29C 48/271* (2019.02); *B29C 48/2715* (2019.02); *B29C 48/297* (2019.02); *B29C 48/385* (2019.02); *B29C 48/39* (2019.02); *B29B 9/12* (2013.01); *B29C 2948/926* (2019.02); *B29C 2948/9239* (2019.02); *B29C 2948/92095* (2019.02); *B29C 2948/92457* (2019.02); *B29C 2948/92828* (2019.02); *B29K 2105/0032* (2013.01)

(58) Field of Classification Search
  CPC .. B29B 7/802; B29B 7/88; B29B 9/06; B29B 9/12; B29B 7/483; B29B 7/728; B29B 7/885; B29C 48/2526; B29C 48/385; B29C 48/39; B29C 2948/92095; B29C 48/2692; B29C 48/271; B29C 48/2715; B29C 48/297; B29C 2948/92828; B29C 2948/9239; B29C 2948/92457; B29C 2948/926; B29C 45/1816; B29K 2105/0032
  USPC ....................................................... 366/76.92
  See application file for complete search history.

(56) References Cited

U.S. PATENT DOCUMENTS

| | | | | |
|---|---|---|---|---|
| 5,096,302 A * | 3/1992 | Durina | ................... | B29C 31/02 264/211.21 |
| 5,110,521 A * | 5/1992 | Moller | ................... | B29B 7/7476 366/156.1 |
| 5,225,210 A * | 7/1993 | Shimoda | ................... | B29B 7/94 425/170 |
| 5,232,960 A * | 8/1993 | Wagner | ................... | B29B 7/603 523/435 |
| 5,282,548 A * | 2/1994 | Ishihara | ................... | B29B 7/801 222/64 |
| 5,980,098 A * | 11/1999 | Meier-Kaiser | .......... | B29C 48/29 366/76.3 |
| 6,089,745 A * | 7/2000 | Feistkorn | ................... | B29B 7/60 366/76.92 |
| 6,474,972 B1 * | 11/2002 | Endo | ....................... | B29B 7/826 366/76.2 |
| 7,320,583 B2 * | 1/2008 | Bortone | ................... | B29C 48/92 366/172.1 |
| 8,322,907 B2 * | 12/2012 | Amurri | ................... | B29B 7/603 366/156.2 |
| 11,273,587 B2 * | 3/2022 | Avermeyer | ......... | B29C 48/2563 |
| 2005/0087906 A1 * | 4/2005 | Caretta | ................. | B29C 48/022 264/211 |
| 2008/0093763 A1 * | 4/2008 | Mancosh | ................ | B29C 48/67 264/211 |
| 2012/0213897 A1 * | 8/2012 | Meyer | ................... | B01F 35/831 426/456 |
| 2019/0168418 A1 * | 6/2019 | Conrad | ................... | B29B 7/488 |
| 2019/0202088 A1 * | 7/2019 | Conrad | ................... | B29B 7/603 |
| 2020/0139606 A1 * | 5/2020 | Conrad | ................. | B29C 48/297 |

FOREIGN PATENT DOCUMENTS

| | | | | |
|---|---|---|---|---|
| CN | 104023938 A | 9/2014 | | |
| DE | 42 14 081 A1 | 11/1992 | | |
| DE | 103 34 293 A1 | 3/2005 | | |
| DE | 10 2004 002 401 A1 | 8/2005 | | |
| DE | 10 2007 050681 A1 | 4/2009 | | |
| DE | 20 2008 017267 U1 | 4/2009 | | |
| DE | 10 2013 217 323 A1 | 3/2015 | | |
| EP | 0 841 144 A1 | 5/1998 | | |
| EP | 2 016 995 A1 | 1/2009 | | |
| EP | 3284566 | * | 2/2018 | |
| EP | 3284567 A1 * | 2/2018 | ............. | B29B 7/404 |
| JP | H1052819 A | 2/1998 | | |
| JP | 2002225111 A | 8/2002 | | |
| WO | 9732703 A1 | 9/1997 | | |
| WO | 2007/101359 A2 | 9/2007 | | |
| WO | 2012/152342 A1 | 11/2012 | | |

* cited by examiner

DEVICE AND METHOD FOR PRODUCING A DYED AND AN UNDYED PLASTIC MELT

CROSS REFERENCE TO RELATED APPLICATIONS

This application is a United States National Phase Application of International Application PCT/EP2017/068948 filed Jul. 27, 2017 and claims the benefit of priority under 35 U.S.C. § 119 of European Patent Application Serial No. EP 16 184 549.0 filed on Aug. 17, 2016, the entire contents of which are incorporated herein by reference.

FIELD OF THE INVENTION

The invention relates to a device and to a method for producing a dyed and an undyed plastic melt.

BACKGROUND OF THE INVENTION

A device and a method for producing plastic granulate from a plastic melt are known from DE 10 2004 002 401 A1. The plastic melt generated by means of a screw extruder is extruded in the form of plastic strands and is pelletized by means of an underwater pelletizing installation. A device of this type is used either exclusively for producing dyed plastic granulate or exclusively for producing undyed plastic granulate, thus plastic granulate of natural color. A selective production of dyed and undyed plastic granulate is not possible since a dyeing agent used in the production of a dyed plastic melt would contaminate a subsequently produced undyed plastic melt.

SUMMARY OF THE INVENTION

The invention is based on the object of achieving a device which in a simple, flexible and economical manner enables the selective production of a dyed and an undyed plastic melt.

This object is achieved by a device for producing a dyed and an undyed plastic melt, comprising a multi-shaft screw extruder for providing a plastic melt, having a housing; at least two mutually penetrating housing bores that are configured in the housing; a first infeed opening and a second infeed opening which open into the at least two housing bores; at least two treatment element shafts that are disposed so as to be rotatingly drivable in the housing bores; a first metering installation for feeding an undyed plastic material through the first infeed opening into the at least two housing bores; a second metering installation for feeding at least one color granulate through the second infeed opening into the at least two housing bores; and a control installation for selecting between a first operating mode for producing the dyed plastic melt and a second operating mode for producing the undyed plastic melt. It has been acknowledged according to the invention that the multi-shaft screw extruder in the region of the at least two housing bores and of the at least two treatment element shafts disposed therein has sufficient self-cleaning, but the feeding of the color granulate, or of the color masterbatch granulate, respectively, into the at least two housing bores has to be performed separately so as to avoid any contamination of the undyed plastic melt by residual color granulate and dyeing agent contained wherein. On account of the two separate infeed openings, the undyed plastic material for providing or producing, respectively, the undyed plastic melt and the color granulate, or the dyeing agent contained therein, respectively, for producing the dyed plastic melt are fed into the at least two housing bores in a strictly mutually separate manner. On account of the selection of the first operating mode by means of the control installation, the metering installations are actuated in such a manner that either the dyed plastic melt is capable of being produced in the first operating mode, or the undyed plastic melt is capable of being produced in the second operating mode. The metering installations are thus capable of being operated in a mutually independent manner by means of the control installation. For example, the control installation is configured in such a manner that selectively the first metering installation is capable of being exclusively operated, or the second metering installation is capable of being exclusively operated, or both metering installations are capable of being conjointly operated.

In the first operating mode the undyed plastic material by means of the first metering installation is fed into the housing bores. Additionally, the color granulate by means of the second metering installation is fed through the second infeed opening into the housing bores. The dyed plastic melt comprises between 0.5% by weight and 10% by weight, in particular between 1% by weight and 6% by weight, and in particular between 1.5% by weight and 4% by weight dyeing agent which is contained in the color granulate, and between 90% by weight and 99.5% by weight, in particular between 94% by weight and 99% by weight, and in particular between 96% by weight and 98.5% by weight undyed plastic material. Additionally, other additives than the dyeing agent can be mixed with the dyed plastic melt, said additives not being considered in the weight proportions stated above. The undyed plastic material is fed as bulk material, in particular as powder and/or granulate, and/or as melt. A granulate mixture from the dyeing agent and a plastic material is referred to as color granulate, or color masterbatch granulate, or masterbatch granulate, respectively. The color granulate comprises the dyeing agent which in a concentrated form is bound in the plastic material and thus configures the color granulate. The dyeing agent is carbon black, for example. The plastic material is identical to the undyed plastic material, for example.

In the second operating mode, only the undyed plastic material by means of the first metering installation is fed through the first infeed opening into the at least two housing bores. The plastic material is fed as bulk material, in particular as powder and/or granulate, and/or as melt.

On account of only a single multi-shaft screw extruder being required, the complexity in terms of machine technology is significantly reduced such that the selective production of the dyed and the undyed plastic melt is possible in a simple and economical manner. The at least two treatment element shafts are in particular rotatingly drivable in the same direction. The multi-shaft screw extruder is preferably configured as a dual-shaft screw extruder. When the undyed plastic melt is produced first, the subsequent production of the dyed plastic melt is possible in a simple, rapid and flexible manner since the dyed plastic melt is not contaminated by the undyed plastic melt. By contrast, when the dyed plastic melt is produced first, in order for the undyed plastic melt to be produced, an impure plastic melt is thus initially produced in a transition period since the multi-shaft screw extruder carries out self-cleaning. The at least two treatment element shafts for self-cleaning are configured so as to mutually mesh in a tight manner and so as to scrape a housing internal wall. Once self-cleaning has been completed after the transition period, the undyed plastic melt is thus produced without any complex cleaning measures. The impure plastic melt that is discharged from the multi-shaft screw extruder in the transition period is pelletized, for example, and the impure plastic granulate generated is separated from the undyed plastic granulate generated and from the dyed plastic granulate generated. The device thus enables a selective production of the dyed and the undyed plastic melt in a simple, flexible and economical manner.

A device wherein the control installation is configured in such a manner that in the first operating mode the undyed plastic material by means of the first metering installation through the first infeed opening, and the color granulate by means of the second metering installation through the second infeed opening, are capable of being fed into the at least two housing bores; and in the second operating mode the undyed plastic material by means of the first metering installation capable of being fed through the first infeed opening into the at least two housing bores guarantees a simple selective production of the dyed and the undyed plastic melt. In the first operating mode the control installation actuates the first metering installation and the second metering installation in such a manner that the undyed plastic material by means of the first metering installation through the first infeed opening, and the color granulate by means of the second metering installation through the second infeed opening, are fed into the at least two housing bores. Additionally, additives other than the dyeing agent contained in the color granulate can be fed into the at least two housing bores. In the second operating mode the control installation actuates the first metering installation in such a manner that the undyed plastic material required is fed through the first infeed opening into the at least two housing bores. In the second operating mode the second metering installation is actuated by the control installation in such a manner that no color granulate is fed through the second infeed opening. The second metering installation in the second operating mode is preferably completely deactivated.

A device configured such that the second metering installation comprises a first metering unit for feeding the color granulate, and a second metering unit for feeding a cleaning granulate, said metering units opening into the second infeed opening, guarantees a simple, flexible and economical selective production of the dyed and the undyed plastic melt. On account of the second metering installation comprising a first metering unit for feeding the color granulate, and a second metering unit for feeding a cleaning granulate, the production can be converted in a simple manner from the first operating mode to the second operating mode. In a cleaning mode after the production of the dyed plastic melt, the cleaning granulate by means of the second metering installation is fed through the second infeed opening into the at least two housing bores. On account of the cleaning granulate, the second infeed opening and the multi-shaft screw extruder in a transition period are cleaned of the color granulate or the dyeing agent, respectively. The second metering installation is deactivated upon completion of cleaning, and the cleaning mode is terminated. In the second operating mode the undyed plastic material by means of the first metering installation is subsequently fed through the first infeed opening into the at least two housing bores. The cleaning granulate is a regranulate, for example.

A device wherein the control installation is configured in such a manner that in a cleaning mode a cleaning granulate by means of the second metering installation is capable of being fed through the second infeed opening into the at least two housing bores guarantees a simple, flexible and economical production of the dyed and the undyed plastic melt.

After the production of the dyed plastic melt in the first operating mode, the multi-shaft screw extruder is first cleaned in a cleaning mode. To this end, the cleaning granulate by means of the second metering installation is fed into the at least two housing bores. Self-cleaning of the multi-shaft screw extruder takes place in a transition period after the termination of the first operating mode. An impure plastic melt which is capable of being utilized neither as a dyed plastic melt nor as an undyed plastic melt is created in said transition period, said impure plastic melt therefore being separated. Self-cleaning, or the cleaning mode, respectively, is terminated after the transition period such that the undyed plastic melt is subsequently capable of being produced in the desired manner in the second operating mode. The cleaning granulate is a regranulate, for example.

A device configured such that the treatment element shafts therebetween configure a gap, and such that a width $A_1$ of the gap in relation to an external diameter D of the treatment element shafts is: $0.003 \leq A_1/D \leq 0.05$, in particular $0.004 \leq A_1/D \leq 0.035$, and in particular $0.011 \leq A_1/D \leq 0.02$, guarantees a simple, flexible and economical selective production of the dyed and the undyed plastic melt. On account of the at least two treatment element shafts being configured so as to mutually mesh in a tight manner, said treatment element shafts in a simple manner are also self-cleaning.

A device configured such that the treatment element shafts conjointly with a housing internal wall of the housing configure a gap, and such that a width $A_2$ of the gap in relation to an external diameter D of the treatment element shafts is: $0.004 \leq A_2/D \leq 0.03$, in particular $0.005 \leq A_2/D \leq 0.025$, and in particular $0.012 \leq A_2/D \leq 0.019$, guarantees a simple, flexible and economical selective production of the dyed and the undyed plastic melt. On account of the at least two treatment element shafts scraping the housing internal wall, the latter in a simple manner is cleaned by the at least two treatment element shafts.

A device configured such that the second infeed opening in a conveying direction is disposed upstream of the first infeed opening guarantees a simple, flexible and economical selective production of the dyed and the undyed plastic melt. On account of the second infeed opening being disposed upstream of the first infeed opening, complete self-cleaning of the treatment element shafts and of the housing internal wall of the housing is possible in a simple manner by feeding a cleaning granulate through the second infeed opening. Converting the device from the first operating mode to the second operating mode is possible in a rapid and flexible manner.

A device configured such that the at least two treatment element shafts comprise in each case one shaft, and kneading elements are disposed so as to be rotationally fixed on the shafts between the infeed openings guarantees a simple, flexible and economical selective production of the dyed and the undyed plastic melt. On account of kneading elements as treatment elements being disposed so as to be rotationally fixed on the shafts between the infeed openings, the color granulate that is fed through the second infeed opening is already heated ahead of the first infeed opening and in particular at least partially or completely melted. In the first operating mode the additionally required thermal input for melting the color granulate and optionally the plastic material fed through the first infeed opening downstream of the first infeed opening is minor. The complexity in terms of machine technology downstream of the first infeed opening is in particular minor on account thereof. The kneading elements can be configured as individual kneading disks and/or as kneading blocks. The respective kneading block comprises a plurality of integrally interconnected kneading disks.

A device configured such that the at least two treatment element shafts comprise in each case one shaft, and screw elements are disposed so as to be rotationally fixed on the shafts between the infeed openings guarantees a simple selective production of the dyed and the undyed plastic melt. On account of screw elements as treatment elements being exclusively disposed so as to be rotationally fixed on the shafts between the infeed openings, the complexity in terms of machine technology is minor in the portion between the infeed openings. The color granulate that is fed through the second infeed opening is conveyed by means of the screw element only in one conveying direction to the first infeed opening. In the first operating mode the color granulate is fed in the desired manner through the second infeed opening. In the second operating mode no feeding of color granulate is performed through the second infeed opening. In the cleaning mode the cleaning granulate is fed through the second infeed opening.

A device configured such that the at least two treatment element shafts comprise in each case one shaft, and screw elements and kneading elements are disposed so as to be rotationally fixed on the shafts downstream of the infeed openings guarantees a simple, flexible and economical selective production of the dyed and the undyed plastic melt. The screw elements and the kneading elements in a simple manner enable melting the plastic material and/or the color granulate, and/or homogenizing the dyeing agent contained in the color granulate and the plastic material. The kneading elements can be configured as individual kneading disks and/or as kneading blocks. The respective kneading block comprises a plurality of integrally interconnected kneading disks.

The invention is furthermore based on the object of achieving a method which in a simple, flexible and economical manner enables the selective production of a dyed and an undyed plastic melt.

This object is achieved by a method for producing a dyed and an undyed plastic melt, comprising the following method steps: providing a multi-shaft screw extruder having a housing; at least two mutually penetrating housing bores that are configured in the housing; a first infeed opening and a second infeed opening which open into the at least two housing bores; at least two treatment element shafts that are disposed so as to be rotatingly drivable in the housing bores; providing a first metering installation and a second metering installation; selecting between a first operating mode for producing the dyed plastic melt and a second operating mode for producing the undyed plastic melt by means of a control installation, wherein in the first operating mode an undyed plastic material by means of the first metering installation through the first infeed opening, and a color granulate by means of the second metering installation through the second infeed opening, are fed into the at least two housing bores; and in the second operating mode the undyed plastic material by means of the first metering installation is fed through the first infeed opening into the at least two housing bores; and operating the multi-shaft screw extruder and the metering installations in the selected operating mode. The advantages of the method according to the invention correspond to the already described advantages of the device according to the invention. The method can in particular also be refined by way of the features according to the inventive device.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
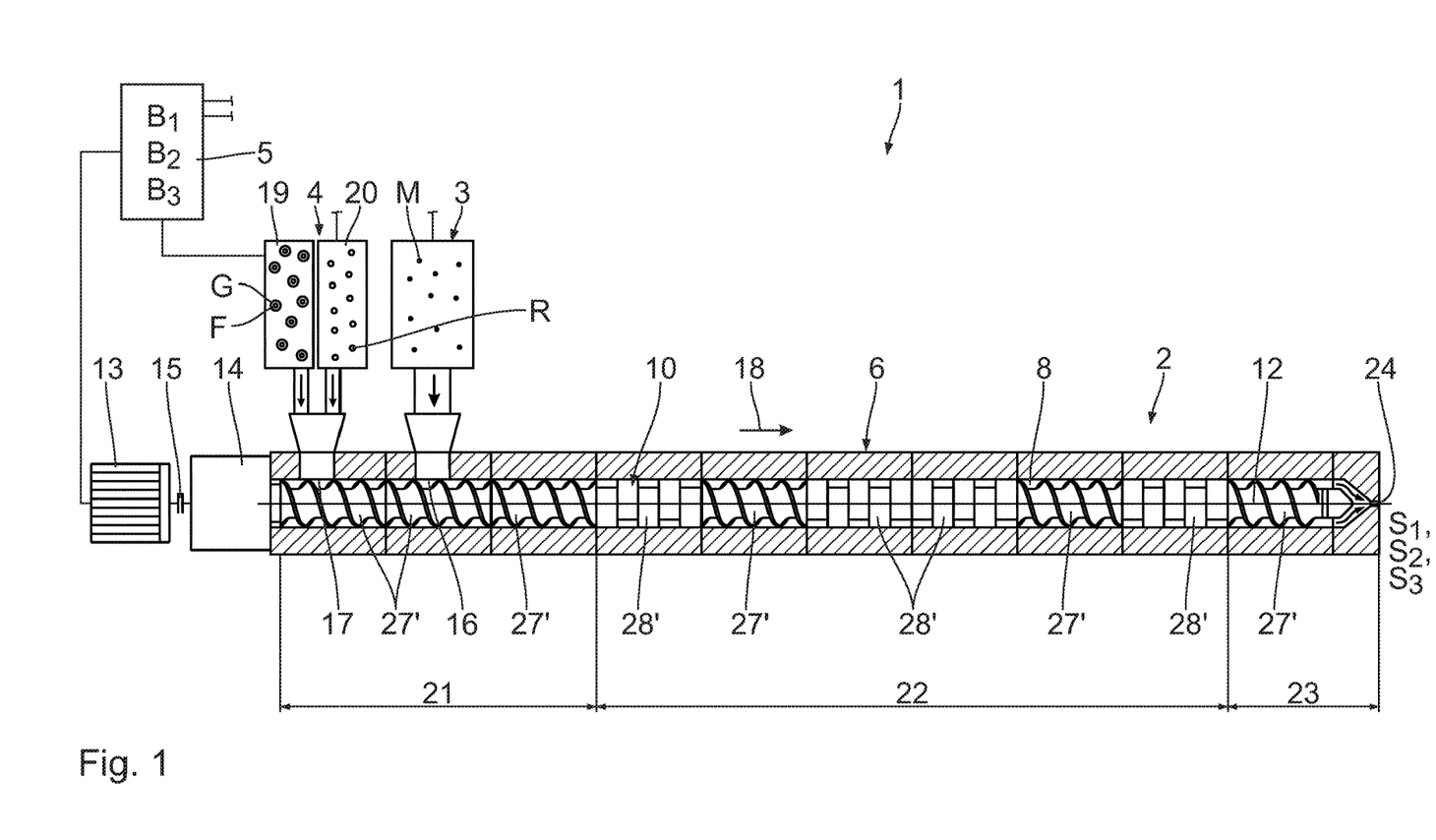
FIG. 1 is a partial sectional view of a device for producing a dyed and an undyed plastic melt according to a first exemplary embodiment.
Figure 2:
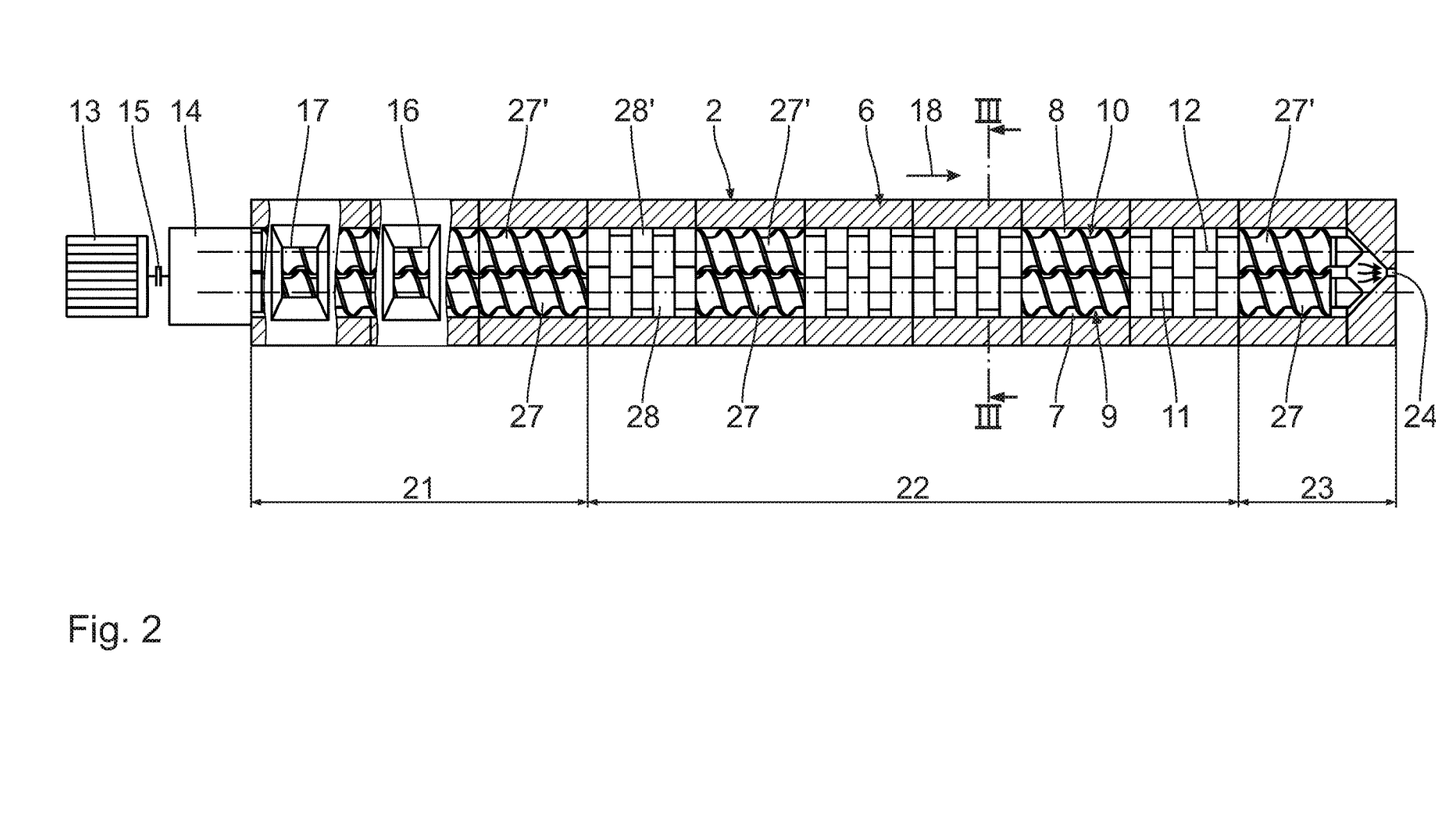
FIG. 2 is a partially sectional plan view of a multi-shaft screw extruder of the device in FIG. 1.
Figure 3:
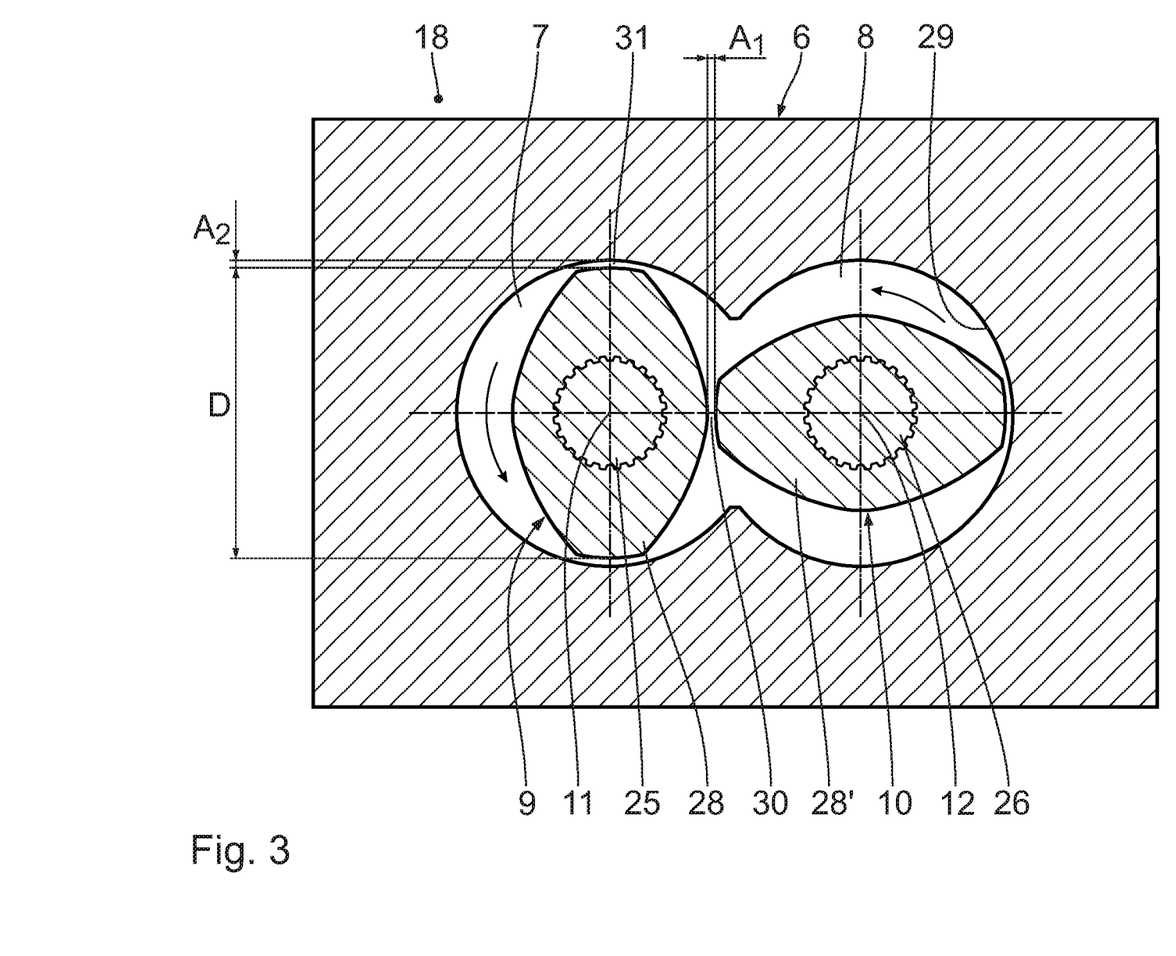
FIG. 3 is a sectional view of the multi-shaft screw extruder along a section line III-III in FIG. 2.

A first exemplary embodiment of the invention is described hereunder by means of FIGS. 1 to 3. A device 1 for producing a dyed plastic melt $S_1$ and an undyed plastic melt $S_2$ comprises a multi-shaft screw extruder 2, a first metering installation 3, a second metering installation 4, and a control installation 5. The multi-shaft screw extruder 2 has a housing 6 in which two mutually penetrating housing bores 7, 8 are configured. Treatment element shafts 9, 10 are disposed so as to be rotatable about associated rotation axes 11, 12 in the housing bores 7, 8. The treatment element shafts 9, 10 by means of a drive motor 13, and by way of a transfer gearbox 14, are rotatingly drivable in the same direction, thus in identical directions. A clutch 15 is disposed between the drive motor 13 and the transfer gearbox 14.

A first infeed opening 16 and a second infeed opening 17 which open into the housing bores 7, 8 are configured in the housing 6. The second infeed opening 17 in a conveying direction 18 is disposed upstream of the first infeed opening 16. The first metering installation 3 opens into the first infeed opening 16 and serves for feeding an undyed plastic material M through the first infeed opening 16 into the housing bores 7, 8. The first metering installation 3 is configured as gravimetric metering unit, for example.

The second metering installation 4 comprises a first metering unit 19 and a second metering unit 20. A color granulate G by means of the first metering unit 19, and a cleaning granulate R by means of the second metering unit 20, are capable of being fed through the second infeed opening 17 into the housing bores 7, 8. The metering units 19, 20 are configured as gravimetric metering units, for example.

The screw extruder 2 in the conveying direction 18 has in succession a drawing-in zone 21, a melting and mixing zone 22, and a discharge zone 23. The housing 6 at the end side of the discharge zone 23 has a discharge opening 24. The infeed openings 16, 17 are disposed in the drawing-in zone 21. The treatment element shafts 9, 10 comprise in each case an associated shaft 25, 26 on which screw elements 27, 27' and kneading elements 28, 28' in succession in the conveying direction 18 are disposed in pairs side by side so as to be rotationally fixed on said shafts 25, 26. Screw elements 27, 27' are exclusively disposed so as to be rotationally fixed on the shafts 25, 26 in the drawing-in zone 21. Screw elements 27, 27' and kneading elements 28, 28' are disposed so as to be rotationally fixed on the shafts 25, 26 in the melting and mixing zone 22. Screw elements 27, 27' are in turn exclusively disposed so as to be rotationally fixed on the shafts 25, 26 in the discharge zone 23. The kneading elements 28, 28' are configured, for example, as individual kneading disks and/or as kneading blocks having a plurality of integrally interconnected kneading disks.

The treatment element shafts 9, 10 are configured so as to mutually mesh in a tight manner and so as to scrape a housing internal wall 29 of the housing 6. To this end, the treatment element shafts 9, 10 are mutually disposed in such a manner that a gap 30 delimited by the treatment element shafts 9, 10, when viewed in the cross section, has a width $A_1$, where the width $A_1$ in relation to an external diameter D of the treatment element shafts 9, 10 is: $0.003 \leq A_1/D \leq 0.05$, in particular $0.004 \leq A_1/D \leq 0.035$, and in particular $0.011 \leq A_1/D \leq 0.02$.

Furthermore, the treatment element shafts 9, 10, conjointly with the housing internal wall 29, form a respective gap 31 which, when viewed in the cross section, has an associated width $A_2$, where the width $A_2$ to external diameter D ratio is: $0.004 \leq A_2/D \leq 0.03$, in particular $0.005 \leq A_2/D \leq 0.025$, and in particular $0.012 \leq A_2/D \leq 0.019$.

The control installation 5 serves for selecting between a first operating mode $B_1$ for producing the dyed plastic melt $S_1$ and a second operating mode $B_2$ for producing the undyed plastic melt $S_2$. To this end, the control installation 5 in terms of signaling is connected to the multi-shaft screw extruder 2, the first metering installation 3, and the second metering installation 4. The control installation 5 is configured in such a manner that in the first operating mode $B_1$ the undyed plastic material M by means of the first metering installation 3 is capable of being fed through the first infeed opening 16, and the color granulate G by means of the second metering installation 4, or the first metering unit 19, respectively, is capable of being fed through the second infeed opening 17. The control installation 5 is furthermore configured in such a manner that in the second operating mode $B_2$ the undyed plastic material M by means of the first metering installation 3 is capable of being fed through the first infeed opening 16 into the at least two housing bores 7, 8. No color granulate G is capable of being fed into the housing bores 7, 8 by means of the second metering installation 4 in the second operating mode $B_2$. The control installation 5 is furthermore configured in such a manner that the device 1 in a conversion from the first operating mode $B_1$ to the second operating mode $B_2$ is initially operated in a cleaning mode $B_3$. In the cleaning mode $B_3$, the cleaning granulate R by means of the second metering installation 4, or by means of the second metering unit 20 respectively, is capable of being fed through the second infeed opening 17 into the housing bores 7, 8. The first metering unit 19 is deactivated in the cleaning mode $B_3$. In the cleaning mode, plastic material M by means of the first metering installation 3 can additionally be fed through the first infeed opening 16 so as to improve or accelerate, respectively, self-cleaning of the multi-shaft screw extruder 2 downstream of the first infeed opening 16.

The functioning mode of the device 1 is as follows:

A selection between the first operating mode $B_1$ and the second operating mode $B_2$ is possible by means of the control installation 5. The production of the dyed plastic melt $S_1$ is performed in the first operating mode $B_1$, whereas the production of the undyed plastic melt $S_2$ is performed in the second operating mode $B_2$.

The undyed plastic material M and the color granulate G are fed to the multi-shaft screw extruder 2 in the first operating mode $B_1$. The color granulate G in the drawing-in zone 21 makes its way through the second infeed opening 17 into the housing bores 7, 8, and by means of the screw elements 27, 27' is conveyed in the conveying direction 18 only to the first infeed opening 16. The undyed plastic material M in the drawing-in zone 21 is fed through the first infeed opening 16 into the housing bores 7, 8. The undyed plastic material M and the color granulate G are conveyed to the melting and mixing zone 22. The color granulate G and optionally the plastic material M is/are melted in the melting and mixing zone 22, and the molten plastic material M is mixed with the dyeing agent F which is contained in the infed color granulate G such that the dyed plastic melt $S_1$ is created. The dyed plastic melt $S_1$ is subsequently discharged through the discharge opening 24 in the discharge zone 23. The dyed plastic melt $S_1$ is subsequently pelletized in the usual manner, and a dyed plastic granulate is generated, for example.

The undyed plastic material, thus the plastic material M of natural color, is fed as bulk material, in particular as powder and/or granulate, and/or as melt. The dyeing agent F is present in a bound form in the color granulate G. The color granulate G is, for example, a mixture from the undyed plastic material M and the dyeing agent F. The dyeing agent F is contained in a concentrated form in the color granulate G. The dyeing agent F is carbon black, for example.

The dyed plastic melt $S_1$ comprises between 0.5% by weight and 10% by weight, in particular between 1% by weight and 6% by weight, and in particular between 1.5% by weight and 4% by weight dyeing agent F, and between 90% by weight and 99.5% by weight, in particular between 94% by weight and 99% by weight, and in particular between 96% by weight and 98.5% by weight undyed plastic material M. Additionally, other additives than the dyeing agent F can be mixed with the dyed plastic melt $S_1$, said additives not being considered in the weight proportions stated above.

When the second operating mode $B_2$ is subsequently selected by means of the control installation 5, a cleaning mode $B_3$ is initially activated. In the cleaning mode $B_3$ the cleaning granulate R by means of the second metering installation 4, or the second metering unit 20, respectively, is fed through the second infeed opening 17 into the housing bores 7, 8. No color granulate G is fed in the cleaning mode $B_3$. In the cleaning mode $B_3$, undyed plastic material M by means of the first metering installation 3 can additionally be fed through the first infeed opening 16 into the housing bores 7, 8. Self-cleaning of the multi-shaft screw extruder 2 takes place in a transition period after the termination of the first operating mode $B_1$, thus during the cleaning mode $B_3$. Residual color granulate G and/or residual dyeing agent F which are/is located in the region of the second infeed opening 17 and in housing bores 7, 8, in particular on the treatment element shafts 9, 10 and on the housing internal wall 29, by virtue of the tightly meshing configuration of the treatment element shafts 9, 10 and of the scraping of the housing internal wall 29 by means of the treatment element shafts 9, 10, are/is removed from the multi-shaft screw extruder 2. An impure plastic melt $S_3$ which is capable of being utilized neither as a dyed plastic melt $S_1$ nor as an undyed plastic melt $S_2$ is created in said transition period, said impure plastic melt $S_3$ therefore having to be separated. Self-cleaning is completed after the transition period such that the cleaning mode $B_3$ is terminated. To this end, the second metering installation 4, or the second metering unit 20, respectively, is deactivated such that cleaning granulate R no longer makes its way through the second infeed opening 17 into the housing bores 7, 8. The undyed plastic melt $S_2$ is subsequently generated in the second operating mode $B_2$. To this end, the undyed plastic material M by means of the first metering installation 3 is fed through the first infeed opening 16 into the housing bores 7, 8 and conveyed to the melting and mixing zone 22 and therein is optionally melted and subsequently discharged in the discharge zone 23. The plastic material M in the second operating mode $B_2$ is fed as bulk material, in particular as powder and/or granulate, and/or as melt.

A conversion from the second operating mode $B_2$ to the first operating mode $B_1$ is possible in a simple manner since no self-cleaning of the multi-shaft screw extruder 2 is required for producing the dyed plastic melt $S_1$.

Figure 4:
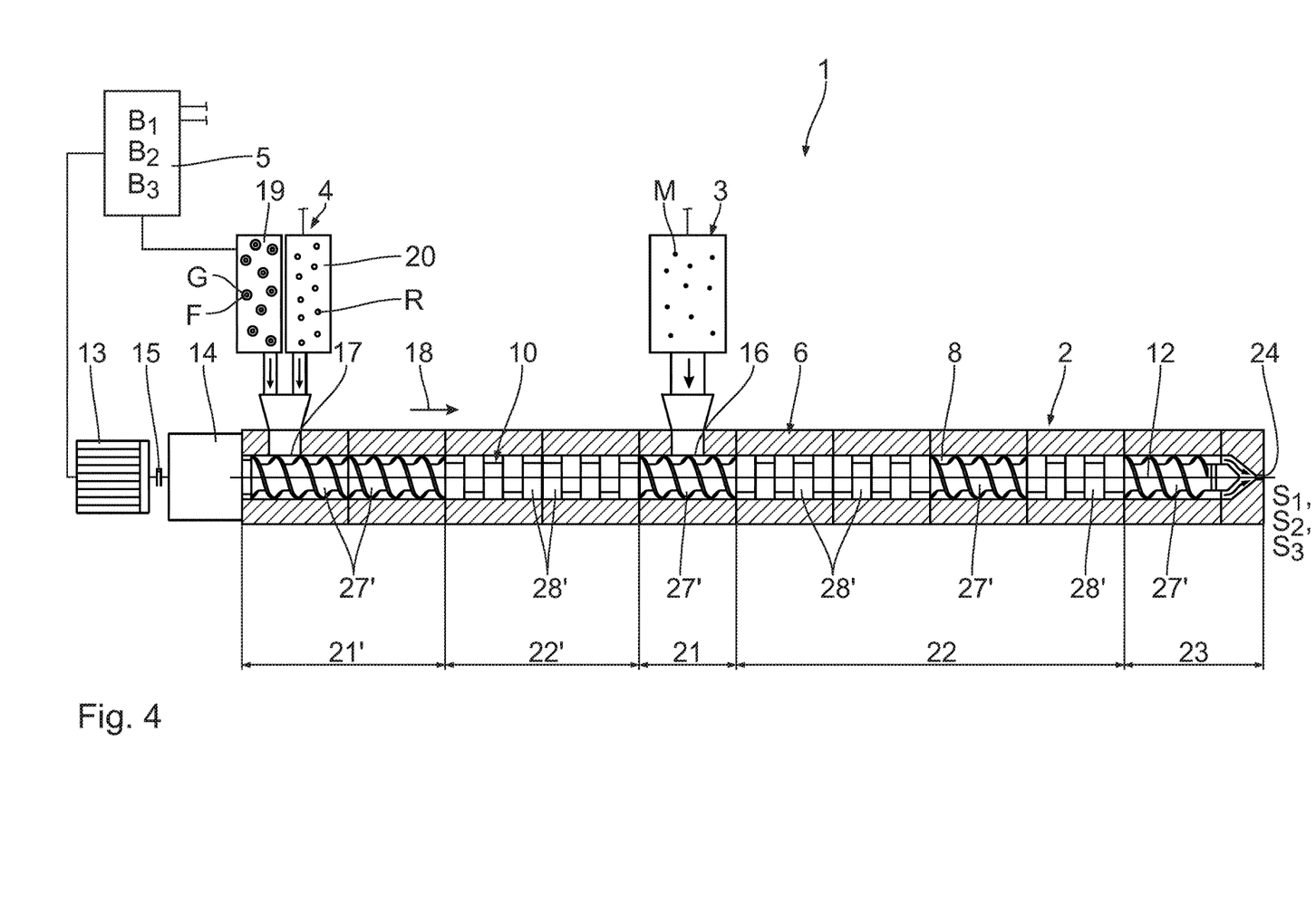
FIG. 4 is a partial sectional view of a device for producing a dyed and an undyed plastic melt according to a second exemplary embodiment.
Figure 5:
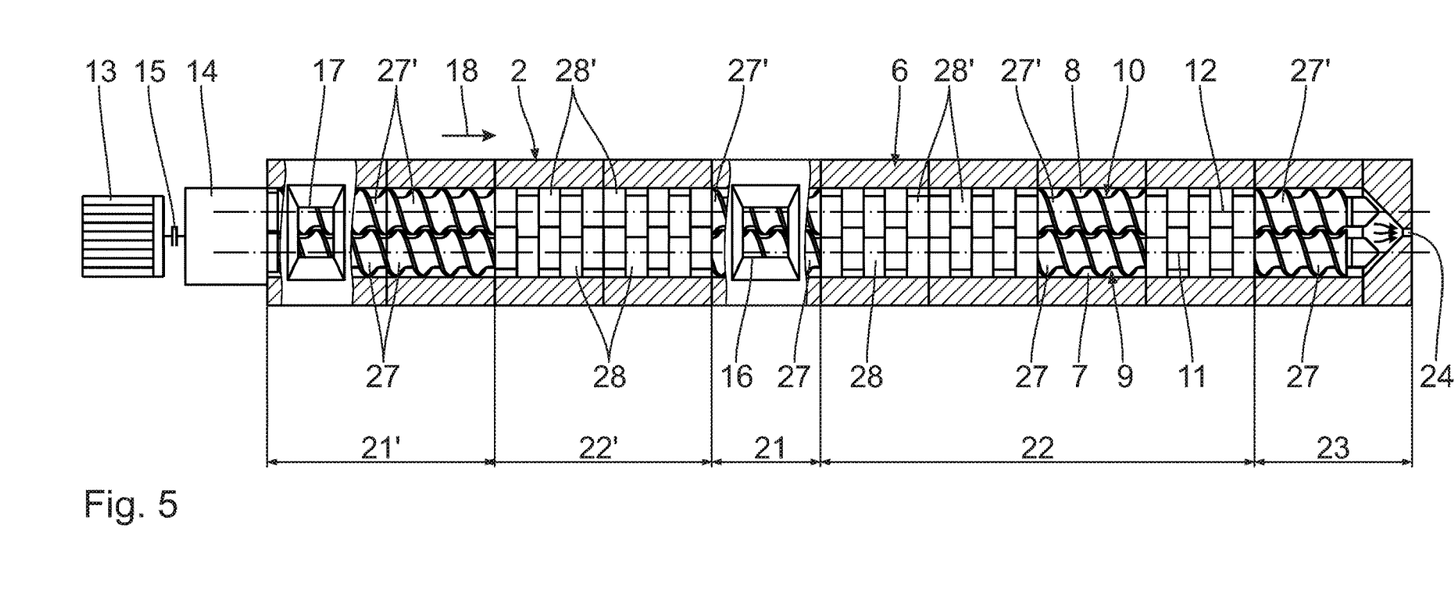
FIG. 5 is a partially sectional plan view of a multi-shaft screw extruder of the device in FIG. 4.

A second exemplary embodiment of the invention is described hereunder by means of FIGS. 4 and 5. As opposed to the preceding exemplary embodiment, the multi-shaft screw extruder 2 in the conveying direction 18 configures in succession a first drawing-in zone 21', a melting zone 22', a second drawing-in zone 21, the melting and mixing zone 22, and the discharge zone 23. Screw elements 27, 27' are exclusively disposed so as to be rotationally fixed on the shafts 25, 26 in the region of the first drawing-in zone 22'. By contrast, kneading elements 28, 28' are in turn exclusively disposed so as to be rotationally fixed on the shafts 25, 26 in the melting zone 22'. The kneading elements 28, 28' are configured as individual kneading disks and/or as kneading blocks having a plurality of integrally interconnected kneading disks. The second infeed opening 17 is disposed in the first drawing-in zone 21', thus upstream of the first infeed opening 16. The first infeed opening 16 is disposed in the second drawing-in zone 21. The melting zone 22' is thus disposed between the infeed openings 16, 17. Accordingly, screw elements 27, 27' and kneading elements 28, 28' are disposed so as to be rotationally fixed on the shafts 25, 26 between the infeed openings 16, 17.

In the first operating mode $B_1$ the color granulate G by means of the second metering installation 4, or the first metering unit 19, respectively, is fed through the second infeed opening 17 into the first drawing-zone 21'. The color granulate G is conveyed to the melting zone 22' and melted therein by means of the kneading elements 28, 28'. The undyed plastic material M by means of the first metering installation 3 is fed through the first infeed opening 16 to the molten color granulate G in the second drawing-in zone 21. The molten color granulate G, or the dyeing agent F contained therein, respectively is mixed with the plastic material M that is present as melt in the melting and mixing zone 22. The dyed plastic melt $S_1$ is subsequently discharged in the discharge zone 23.

Accordingly, in the cleaning mode $B_3$ the cleaning granulate R is fed through the second infeed opening 17 into the first drawing-in zone 21' and conveyed to the melting zone 22'. The cleaning granulate R is melted in the melting zone 22' and is subsequently conveyed to the second drawing-in zone 21, the melting and mixing zone 22, and the discharge zone 23.

Self-cleaning of the multi-shaft screw extruder 2, in particular of the second infeed opening 17, the treatment element shafts 9, 10, and of the housing internal wall 29, is performed on account thereof. In the cleaning mode $B_3$, plastic material M can additionally be fed through the first infeed opening 16. Reference in terms of the further construction and of the further functional mode is made to the preceding exemplary embodiment.

The device 1 according to the invention enables the selective production of a dyed plastic melt $S_1$ and an undyed plastic melt $S_2$ by way of only a single multi-shaft screw extruder 2. The complexity in terms of machine technology is comparatively minor on account thereof. When the first operating mode $B_1$ is converted to the second operating mode $B_2$, an impure plastic melt $S_3$ is thus created during self-cleaning in a transition period, thus in the cleaning mode $B_3$. The impure plastic granulate produced therefrom, depending on the economics, is sold or in a subsequent production of the dyed plastic melt $S_1$ is re-fed to the multi-shaft screw extruder 2 by way of the second infeed opening 17 and is further processed. The device 1 thus enables a simple, flexible and economical production selectively of a dyed plastic melt $S_1$ and an undyed plastic melt $S_2$.

While specific embodiments of the invention have been shown and described in detail to illustrate the application of the principles of the invention, it will be understood that the invention may be embodied otherwise without departing from such principles.

The invention claimed is:

1. A device for producing a dyed plastic melt and an undyed plastic melt, the device comprising:
   a multi-shaft screw extruder for providing a plastic melt, the multi-shaft screw extruder having a housing, at least two mutually penetrating housing bores configured in the housing, a first infeed opening, a second infeed opening and at least two treatment element shafts disposed so as to be rotatingly drivable in the housing bores, the first infeed opening and the second infeed opening configured to open into the at least two mutually penetrating housing bores;
   a first metering installation for feeding an undyed plastic material through the first infeed opening into the at least two mutually penetrating housing bores;
   a second metering installation for feeding at least one color granulate through the second infeed opening into the at least two mutually penetrating housing bores, wherein the second metering installation comprises a first metering unit for feeding the color granulate, and a second metering unit for feeding a cleaning granulate, said first metering unit and said second metering unit opening into the second infeed opening, wherein the second infeed opening is disposed upstream of the first infeed opening in a conveying direction; and
   a control installation for selecting between a first operating mode for producing the dyed plastic melt and a second operating mode for producing the undyed plastic melt, wherein the control installation is configured such that in a cleaning mode the cleaning granulate is capable of being fed through the second infeed opening into the at least two housing bores via the second metering installation.

2. The device as claimed in claim 1, wherein the control installation is configured such that:
   in the first operating mode the undyed plastic material by the first metering installation through the first infeed opening, and the color granulate by the second metering installation through the second infeed opening, are capable of being fed into the at least two mutually penetrating housing bores; and
   in the second operating mode the undyed plastic material by the first metering installation is capable of being fed through the first infeed opening into the at least two mutually penetrating housing bores.

3. The device as claimed in claim 1, wherein a gap is defined between the at least two treatment element shafts, and a width of the gap in relation to an external diameter of the at least two treatment element shafts is greater than or equal to 0.003 and less than or equal to 0.05.

4. The device as claimed in claim 1, wherein the at least two treatment element shafts and a housing internal wall of the housing define a gap, and a width of the gap in relation to an external diameter of the at least two treatment element shafts is greater than or equal to 0.004 and less than or equal to 0.03.

5. The device as claimed in claim 1, wherein each of the at least two treatment element shafts comprises one shaft to provide at least a plurality of shafts, and kneading elements are rotationally fixed on the shafts between the first infeed opening and the second infeed opening.

6. The device as claimed in claim 1, wherein each of the at least two treatment element shafts comprises one shaft to provide at least a plurality of shafts, and screw elements are rotationally fixed on the shafts between the first infeed opening and the second infeed opening.

7. The device as claimed in claim 1, wherein each of the at least two treatment element shafts comprises one shaft to provide at least a plurality of shafts, and screw elements and kneading elements are disposed so as to be rotationally fixed on the shafts downstream of the first infeed opening and the second infeed opening.

8. The device as claimed in claim 1, wherein a gap is defined between the at least two treatment element shafts, and a width of the gap in relation to an external diameter of the at least two treatment element shafts is greater than or equal to 0.004 and less than or equal to 0.035.

9. The device as claimed in claim 1, wherein a gap is defined between the at least two treatment element shafts, and a width of the gap in relation to an external diameter of the at least two treatment element shafts is greater than or equal to 0.011 and less than or equal to 0.02.

10. The device as claimed in claim 1, wherein the at least two treatment element shafts and a housing internal wall of the housing define a gap, and a width of the gap in relation to an external diameter of the at least two treatment element shafts is greater than or equal to 0.005 and less than or equal to 0.025.

11. The device as claimed in claim 1, wherein the at least two treatment element shafts and a housing internal wall of the housing define a gap, and a width of the gap in relation to an external diameter of the at least two treatment element shafts is greater than or equal to 0.012 and less than or equal to 0.019.

12. A method for producing a dyed and an undyed plastic melt, the method comprising the following method steps:
providing a multi-shaft screw extruder having a housing, at least two mutually penetrating housing bores configured in the housing a first infeed opening, a second infeed opening and at least two treatment element shafts rotatingly drivable in the at least two mutually penetrating housing bores, the first infeed opening and the second infeed configured to open into the at least two mutually penetrating housing bores, wherein the second infeed opening is disposed upstream of the first infeed opening in a conveying direction;
providing a first metering installation and a second metering installation, wherein the second metering installation comprises a first metering unit configured to feed a color granulate, and a second metering unit configured to feed a cleaning granulate, said first metering unit and said second metering unit opening into the second infeed opening;
selecting between a first operating mode for producing the dyed plastic melt and a second operating mode for producing the undyed plastic melt via a control installation, wherein in the first operating mode an undyed plastic material via the first metering installation through the first infeed opening, and the color granulate via the second metering installation through the second infeed opening, are fed into the at least two mutually penetrating housing bores, wherein in the second operating mode the undyed plastic material via the first metering installation is fed through the first infeed opening into the at least two mutually penetrating housing bores, wherein after the production of the dyed plastic melt in the first operating mode the multi-shaft screw extruder is cleaned in a cleaning mode, wherein in the cleaning mode the cleaning granulate is capable of being fed through the second infeed opening into the at least two housing bores via the second metering installation; and
operating the multi-shaft screw extruder, the first metering installation and the second metering installation in a selected operating mode.

13. The method as claimed in claim 12, wherein a gap is defined between the at least two treatment element shafts, and a width of the gap in relation to an external diameter of the at least two treatment element shafts is greater than or equal to 0.003 and less than or equal to 0.05.

14. The method as claimed in claim 12, wherein the at least two treatment element shafts and a housing internal wall of the housing define a gap, and a width of the gap in relation to an external diameter of the at least two treatment element shafts is greater than or equal to 0.004 and less than or equal to 0.03.

15. A device for producing a dyed plastic melt and an undyed plastic melt, the device comprising:
a multi-shaft screw extruder configured to provide a plastic melt, the multi-shaft screw extruder comprising a housing with at least two mutually penetrating housing bores configured in the housing, a first infeed opening, a second infeed opening and at least two treatment element shafts disposed so as to be rotatingly drivable in the housing bores, the first infeed opening and the second infeed opening being configured to open into the at least two mutually penetrating housing bores;
a first metering installation configured to hold a quantity of an undyed plastic material and feed the undyed plastic material through the first infeed opening into the at least two mutually penetrating housing bores;
a second metering installation configured to selectively feed at least one color granulate and a cleaning granulate through the second infeed opening into the at least two mutually penetrating housing bores, the second metering installation comprising:
a first metering unit configured to hold a quantity of the color granulate and feed the color granulate; and
a second metering unit configured to hold a quantity of the cleaning granulate and feed the cleaning granulate, said first metering unit and said second metering unit opening into the second infeed opening, wherein the second infeed opening is disposed upstream of the first infeed opening in a conveying direction; and
a control installation configured to select between:
a first operating mode, including controlling the second metering installation to feed the at least one color granulate with the first metering unit through the second infeed opening into the at least two housing bores via the second metering installation, for producing the dyed plastic melt;
a second operating mode, including controlling the first metering installation to feed the undyed plastic material through the first infeed opening into the at least two housing bores via the first metering installation, for producing the undyed plastic melt; and a cleaning mode, including controlling the second metering installation to feed the cleaning granulate with the second metering unit through the second infeed opening into the at least two housing bores via the second metering installation.

16. The device as claimed in claim 15, wherein for the first operating mode the control installation is configured to control the first metering installation to feed the undyed plastic material through the first infeed opening into the at least two housing bores via the first metering installation with said control of the second metering installation to feed the at least one color granulate with the first metering unit through the second infeed opening into the at least two housing bores via the second metering installation.

17. The device as claimed in claim 15, wherein a gap is defined between the at least two treatment element shafts, and a width of the gap in relation to an external diameter of the at least two treatment element shafts is greater than or equal to 0.003 and less than or equal to 0.05.

18. The device as claimed in claim 15, wherein the at least two treatment element shafts and a housing internal wall of the housing define a gap, and a width of the gap in relation to an external diameter of the at least two treatment element shafts is greater than or equal to 0.004 and less than or equal to 0.03.

19. The device as claimed in claim 15, wherein each of the at least two treatment element shafts comprises one shaft to provide at least a plurality of shafts, and elements rotationally fixed on the shafts between the first infeed opening and the second infeed opening, wherein the elements comprise at least one of screw elements and kneading elements.

20. The device as claimed in claim 15, wherein with a selection of the second operating mode subsequent to operation in the first operating mode the control installation initially activates the cleaning mode including controlling the second metering installation to feed the cleaning granulate with the second metering unit through the second infeed opening into the at least two housing bores via the second metering installation and controlling the second metering installation such that no color granulate is fed with the first metering unit through the second infeed opening.

* * * * *